(12) United States Patent
Hammer et al.

(10) Patent No.: US 11,964,719 B2
(45) Date of Patent: Apr. 23, 2024

(54) BREAKAWAY AUTOMOTIVE STEERING TIE ROD FOR CONTROLLED WHEEL MOTION DURING CRASH

(71) Applicant: TOYOTA MOTOR ENGINEERING & MANUFACTURING NORTH AMERICA, INC., Plano, TX (US)

(72) Inventors: Jeremiah T. Hammer, Ann Arbor, MI (US); Brian L. Tew, Ann Arbor, MI (US); Kristofer L. Karch, Round Lake, IL (US); Nikhil V. Bhosale, Ann Arbor, MI (US); John Kim, Ann Arbor, MI (US); Donald Federico, Manchester, MI (US); Sato Koki, Toyota (JP); Isao Kohno, Aichi (JP)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 341 days.

(21) Appl. No.: 16/998,275

(22) Filed: Aug. 20, 2020

(65) Prior Publication Data

US 2022/0055686 A1    Feb. 24, 2022

(51) Int. Cl.
*B62D 7/22*   (2006.01)
*B62D 3/12*   (2006.01)
(Continued)

(52) U.S. Cl.
CPC .................. *B62D 7/22* (2013.01); *B62D 3/12* (2013.01); *B62D 7/18* (2013.01); *B62D 7/20* (2013.01); *B62D 21/02* (2013.01)

(58) Field of Classification Search
CPC . B62D 3/12; B62D 7/163; B62D 7/18; B62D 7/20; B62D 7/22; B62D 21/02;
(Continued)

(56) References Cited

U.S. PATENT DOCUMENTS

| 5,044,808 A | 9/1991 | Busse |
| 5,104,136 A | 4/1992 | Buhl et al. |
| | (Continued) | |

FOREIGN PATENT DOCUMENTS

| CN | 103253302 A | * | 8/2013 |
| CN | 110562320 A | | 12/2019 |
| | (Continued) | | |

OTHER PUBLICATIONS

Description Translation for KR 2013/0135504 from Espacenet (Year: 2013).*

*Primary Examiner* — Jason D Shanske
*Assistant Examiner* — Daniel M. Keck
(74) *Attorney, Agent, or Firm* — HAYNES AND BOONE, LLP

(57) ABSTRACT

Disclosed is a vehicle having a breakaway tie rod. The tie rod has a longitudinal axis oriented substantially orthogonal to the longitudinal axis of the vehicle, and includes a rod portion and a receiver portion. The rod portion includes a proximal ball joint disposed at the proximal end and a male coupling section disposed at the distal end. The receiver portion includes a female coupling section disposed at the proximal end, a distal ball joint disposed at the distal end, and a narrowing feature disposed between the proximal end and distal end. The male coupling section of the rod portion is received into the female coupling section of the receiver portion, forming a connection, and the distal end of the rod portion is disposed proximate to the narrowing feature. The narrowing feature is configured to fracture when subjected to a threshold force substantially parallel to the longitudinal axis of the vehicle.

14 Claims, 12 Drawing Sheets

(51) Int. Cl.
*B62D 7/18* (2006.01)
*B62D 7/20* (2006.01)
*B62D 21/02* (2006.01)

(58) Field of Classification Search
CPC ........ B62D 25/08; B60G 7/003; B60G 7/005; B60G 2206/016; B60G 2206/11; B60R 2021/0023
USPC .................. 180/274; 280/784; 296/187.1
See application file for complete search history.

(56) References Cited

U.S. PATENT DOCUMENTS

| | | | | |
|---|---|---|---|---|
| 5,529,316 A | * | 6/1996 | Mattila | .................. B62D 17/00 |
| | | | | 280/93.511 |
| 5,983,746 A | * | 11/1999 | Nawata | .................. B60T 7/065 |
| | | | | 180/274 |
| 10,597,077 B2 | | 3/2020 | Putnam et al. | |
| 2013/0298726 A1 | * | 11/2013 | Diekhoff | .................. B62D 7/20 |
| | | | | 74/579 R |
| 2016/0031278 A1 | * | 2/2016 | Schindler | ................ F16C 7/026 |
| | | | | 280/124.125 |
| 2019/0225271 A1 | | 7/2019 | Klinger et al. | |

FOREIGN PATENT DOCUMENTS

| | | | | | |
|---|---|---|---|---|---|
| DE | 102010043778 A1 | * | 5/2012 | ............... B62D 7/20 |
| DE | 102012018553 A1 | * | 3/2014 | ............... B60G 7/001 |
| DE | 102015002546 A1 | * | 9/2016 | ............ B60G 7/001 |
| JP | 2015101112 A | | 6/2015 | |
| JP | 2018131025 A | * | 8/2018 | |
| JP | 6540304 B2 | | 7/2019 | |
| JP | 2019196068 A | | 11/2019 | |
| KR | 20130135504 A | * | 12/2013 | |

* cited by examiner

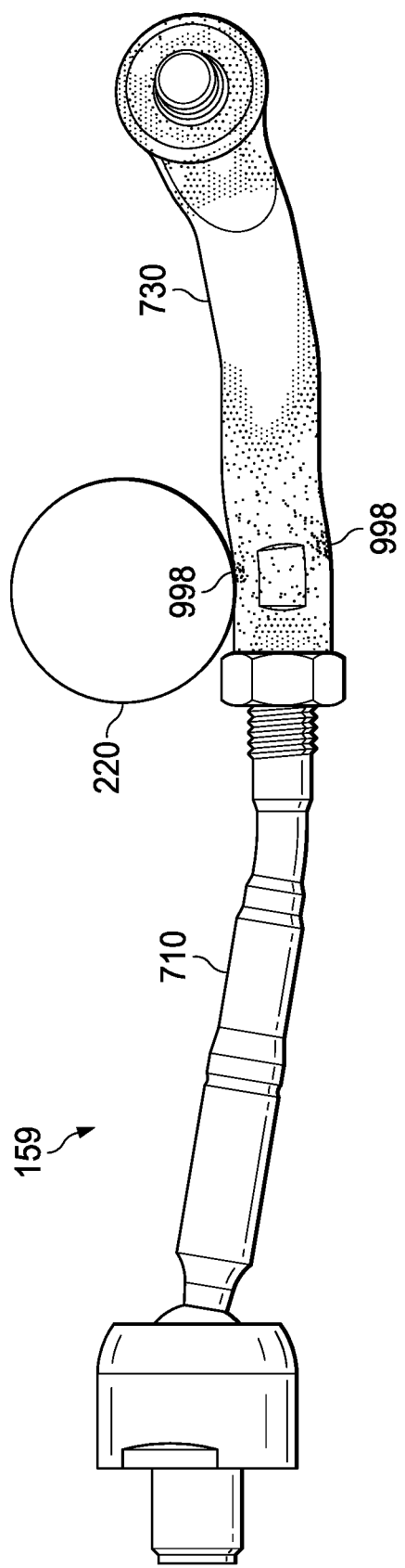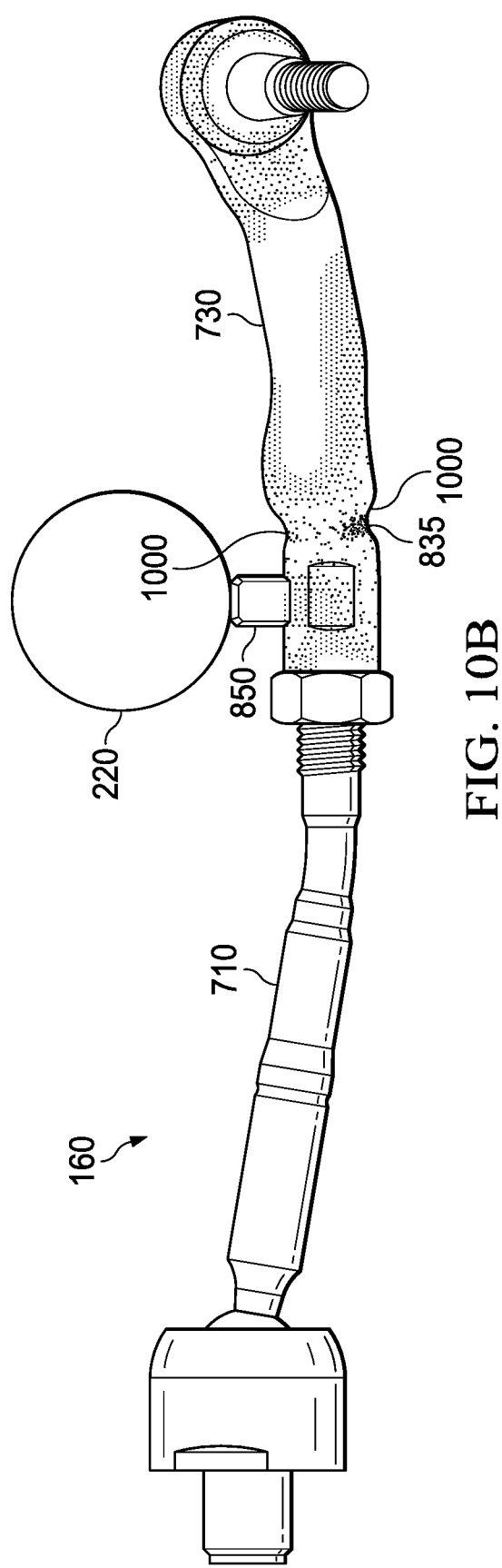

BREAKAWAY AUTOMOTIVE STEERING TIE ROD FOR CONTROLLED WHEEL MOTION DURING CRASH

TECHNICAL FIELD

The subject matter described herein relates to a device, system, and method for improving motor vehicle safety during small overlap rigid barrier (SOL) frontal crashes. This device, system, and method have particular but not exclusive utility for automobiles and trucks.

BACKGROUND

Modern vehicles are designed with crash safety in mind. Crash safety is tested both physically (using actual crashes staged under laboratory conditions) and virtually (using computer models and numerical analysis) to determine the forces, accelerations, and deformations that a given vehicle design will experience in a given set of crash conditions. One particularly challenging scenario occurs during the frontal crash mode called small overlap rigid barrier (SOL), wherein a vehicle strikes a rigid barrier at ~25% overlap or less to the vehicle width. Due to this small overlap between the barrier and the vehicle, the main structural members of the vehicle frame are not directly contacted by the barrier, and the deformation to the vehicle cabin can therefore be severe. To avoid large deformations to the occupant area, it is advantageous to both engage these missed structural members and to push the vehicle away from the barrier. Engaging the structural members of the frame is beneficial, as it permits the structural members to absorb some of the energy of the crash outside of the occupant area (e.g., by bending or crumpling). Pushing the vehicle off the barrier is beneficial because some of the energy is transferred to lateral kinetic energy which will not need to be absorbed by the vehicle. This motion is also beneficial because the vehicle can escape the barrier sooner, which may reduce direct contact between the vehicle cabin and the barrier.

To avoid large deformations to the occupant area it is advantageous to control loading from a wheel/tire and potentially use this wheel/tire as a load path to push the vehicle away from the barrier. Although many methods are used as a load path between vehicle and barrier the components of primary interest here are the wheel and tire. If the motion of these parts can be controlled during a crash they can be used as a load path to prevent high forces and deformation in the occupant area, for example by pushing the vehicle off the barrier, thus increasing stability and repeatability of the crash mode. However, loading between a rigid barrier and a steering tie rod often leads to unwanted forces pushing the front wheel outward from the vehicle or pulling the front wheel inward toward the vehicle. Due to the complex nature of crash dynamics and wheel dynamics, accurately predicting motion of the wheel can be difficult. In general, wheel motion is not repeatable, and small changes in wheel motion can drastically change crash test results. SOL crashes may represent approximately 5% of overall crashes, but because they cause disproportionate vehicle damage and disproportionate risk of injury as compared to other crash types, they are of significant concern in vehicle design and testing. Thus, currently used front wheel steering assemblies have numerous drawbacks, including excessive cabin deformation during SOL crash events, and otherwise. Accordingly, a need exists for improved front wheel assemblies that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a breakaway tie rod that provides control over the motion of a front wheel during collision events, including but not limited to small overlap rigid barrier (SOL) collision events. The breakaway tie rod described herein can be used to tune both the fracture load and the timing of tie rod separation, to allow for a desirable motion of the wheel and tire during a crash event. Specifically, this feature is designed to fracture the steering tie rod during this crash mode to achieve a desirable wheel motion.

The breakaway tie rod controls loading between a wheel of the vehicle and the rigid barrier, helping the wheel to serve as a load path for pushing the vehicle away from the rigid barrier during a crash. The design disclosed herein includes features intended to fracture the tie rod in a particular location, at a particular time, displacement, and/or force loading during the crash event. The breakaway tie rod may be anchored to the steering rack and the wheel knuckle. When the breakaway tie rod is subjected to a bending force by an SOL barrier, the design features cause the breakaway tie rod to fracture rather than bending. This can reduce both the amount of time the tie rod pushes outward on the front wheel, and also the total energy transferred from the tie rod to the wheel. This in turn may improve the vehicle's energy absorption and lateral pushing against the barrier, thus helping the vehicle to push away from the barrier. This may reduce total energy transfer between the barrier and vehicle, as well as rendering crash results more predictable and consistent.

The breakaway tie rod structure disclosed herein has particular, but not exclusive, utility for collision mitigation in automobiles and trucks. One general aspect of the breakaway tie rod includes a longitudinal axis disposed substantially orthogonal to a longitudinal axis of the vehicle; a rod portion aligned with the longitudinal axis of the component, where the rod portion includes: a proximal end; a proximal ball joint disposed at the proximal end; a distal end; a male coupling section disposed at the distal end. The breakaway tie rod also includes a receiver portion aligned with the longitudinal axis of the component, where the receiver portion includes: a proximal end, a female coupling section disposed at the proximal end, a distal end, a distal ball joint disposed at the distal end, and a narrowing feature disposed between the proximal end and distal end. The breakaway tie rod also includes where the male coupling section of the rod portion is received into the female coupling section of the receiver portion, forming a connection, where the distal end of the rod portion is disposed proximate to the narrowing feature.

Implementations may include one or more of the following features. In some embodiments, the narrowing feature is configured to fracture when subjected to a threshold force substantially parallel to the longitudinal axis of the vehicle. In some embodiments, the narrowing feature includes a neck. In some embodiments, the narrowing feature includes at least one notch. In some embodiments, the component further including a protuberance disposed on the receiver portion and projecting in a substantially forward direction along the longitudinal axis of the vehicle. In some embodiments, the distal ball joint connects to a steering knuckle of the vehicle. In some embodiments, the proximal ball joint connects to a steering rack of the vehicle. In some embodiments, the vehicle is configured such that fracturing the narrowing feature prevents the component from affecting motion of a wheel of the vehicle. In some embodiments, the male coupling section includes a male threaded section, where the female coupling section includes a female threaded section. In some embodiments, the receiving portion further includes at least one wrench flat.

One general aspect includes along a longitudinal axis disposed substantially orthogonal to a longitudinal axis of a vehicle, providing a component including: a rod portion including: a proximal end; a proximal ball joint disposed at the proximal end; a distal end; a male threaded section disposed at the distal end. The method also includes providing a receiver portion including: a proximal end, a female threaded section disposed at the proximal end a distal end, and a distal ball joint disposed at the distal end. The method also includes narrowing a section of the receiver portion between the proximal end and distal end; and receiving the male threaded section of the rod portion into the female threaded section of the receiver portion, forming a threaded connection, such that the distal end of the rod portion is disposed proximate to the narrowed section.

Implementations may include one or more of the following features. In some embodiments, the narrowed section of the receiver portion is configured to fracture when subjected to a threshold force substantially parallel to the longitudinal axis of the vehicle. In some embodiments, the narrowed section includes a neck. In some embodiments, the narrowed section includes at least one notch. In some embodiments, the method further includes providing a protuberance disposed on the receiver portion and projecting in a substantially forward direction along the longitudinal axis of the vehicle. In some embodiments, the method further includes connecting the distal ball joint to a steering knuckle of the vehicle. In some embodiments, the method further includes connecting the proximal ball joint to a steering rack of the vehicle. In some embodiments, fracturing the narrowed section prevents the component from affecting motion of a wheel of the vehicle. Implementations of the described techniques may include hardware, a method or process, or computer software on a computer-accessible medium.

One general aspect includes a system for distributing crash energy within a vehicle. The system includes the vehicle; a front wheel of the vehicle; a steering knuckle coupled the front wheel; a frame of the vehicle; a steering rack coupled to the frame; a tie rod, where the tie rod is connected to the steering knuckle by a distal ball joint, where the tie rod is connected to the steering rack by a proximal ball joint, where the tie rod includes: a longitudinal axis; a rod portion aligned with the longitudinal axis, where the rod portion includes: a proximal end; the proximal ball joint disposed at the proximal end; a distal end; a male coupling section disposed at the distal end. The system also includes a receiver portion aligned with the longitudinal axis, where the receiver portion includes: a proximal end, a female coupling section disposed at the proximal end, a distal end, the distal ball joint disposed at the distal end, and a narrowing feature disposed between the proximal end and distal end.

In some embodiments, the receiver portion further includes a protuberance disposed on the receiver portion and projecting in a substantially forward direction along a longitudinal axis of the vehicle.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the breakaway tie rod, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 10A is a is a top view of an example baseline tie rod, which lacks some novel features of the present disclosure, being contacted by a barrier, in accordance with aspects of the present disclosure.

FIG. 10B is a top view of an example breakaway tie rod being contacted by a barrier 220, in accordance with at least one embodiment of the present disclosure.

DETAILED DESCRIPTION

Figure 1:
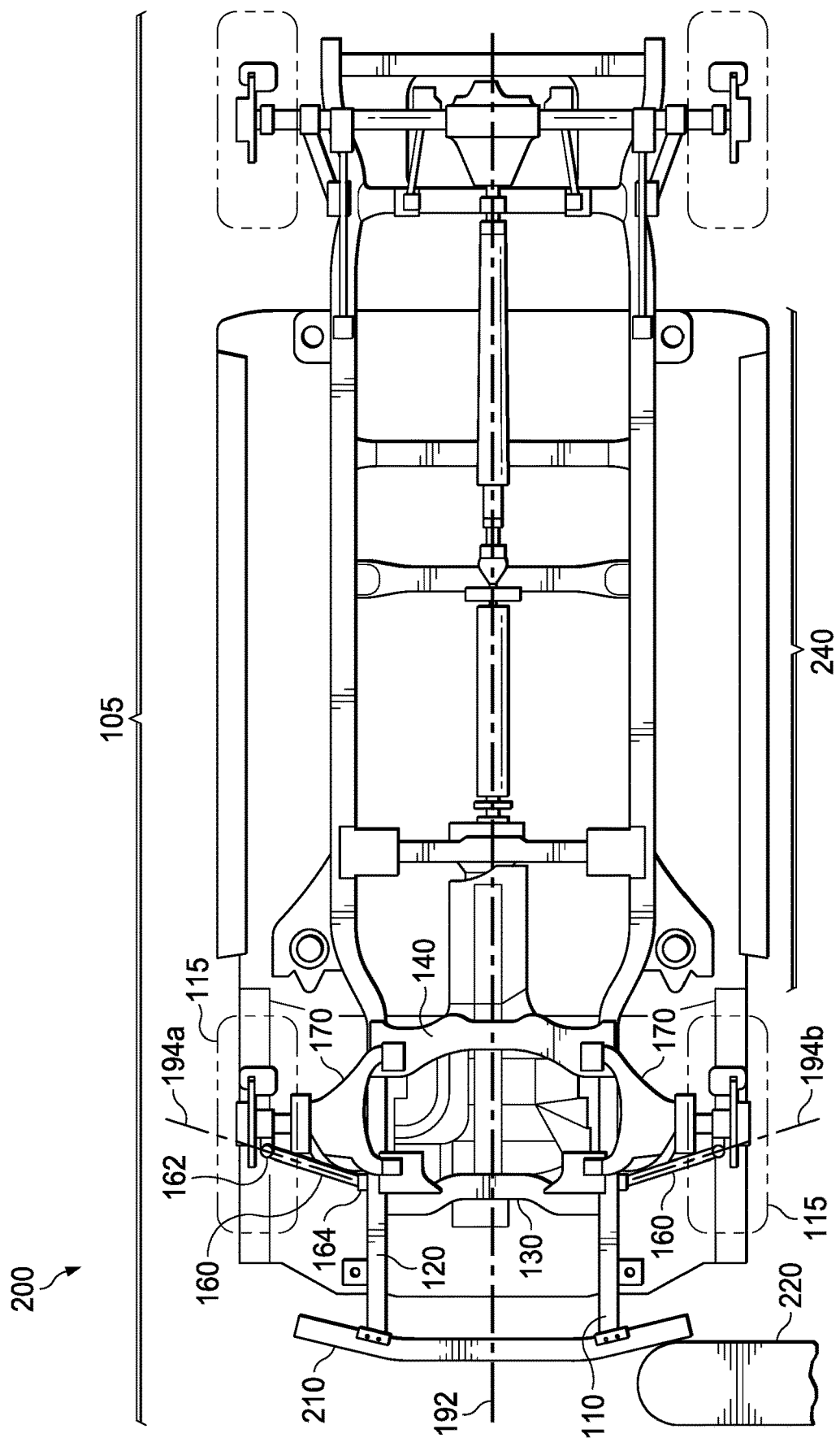
FIG. 1 is a bottom view of an example frame of a vehicle that incorporates breakaway tie rods in accordance with at least one embodiment of the present disclosure.

In accordance with at least one embodiment of the present disclosure, a breakaway tie rod structure is disclosed that provides control over the motion of a front wheel during collision events, including but not limited to small overlap rigid barrier (SOL) collision events. Current designs of the part do not have any features for controlled fracture. With a standard design, fracture timing during a crash can vary by a significant amount. These variations can result in a less than ideal fracture timing, which could be detrimental to vehicle occupants, e.g., by creating deformation of, or intrusion into, the passenger cabin.

With features located on the tie rod, as described herein, the wheel motion can be controlled, and cabin deformations can be reduced. In this specific case we are trying to fracture the tie rod after contact to the barrier/wall and have the wheel rotate into a catcher on the frame. The breakaway tie rod described herein can be used to tune both the fracture load and the timing of separation, to allow for a desirable motion of the wheel and tire during a crash event. Specifically, this feature is designed to fracture the steering tie rod during the SOL crash mode to achieve a desirable wheel motion.

The breakaway tie rod controls loading between a wheel of the vehicle and the rigid barrier, helping the wheel to serve as a load path for pushing the vehicle away from the rigid barrier during a crash. The design disclosed herein includes features intended to fracture the tie rod in a particular location, at a particular time, displacement, and/or force loading during the crash event. The breakaway tie rod may be anchored to the steering rack and the wheel knuckle. When the breakaway tie rod is subjected to a lateral bending force by an SOL barrier, the design features cause the breakaway tie rod to fracture rather than bending. This can reduce both the amount of time the tie rod pushes outward on the front wheel, and also the total energy transferred from the tie rod to the wheel. This in turn may improve the vehicle's energy absorption and lateral pushing against the barrier, thus helping the vehicle to push away from the barrier. This may reduce total energy transfer between the barrier and vehicle, as well as rendering crash results more predictable and consistent.

These descriptions are provided for exemplary purposes only, and should not be considered to limit the scope of the breakaway tie rod. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a bottom view of an example vehicle frame 105 of a vehicle 200 that incorporates breakaway tie rods 160, in accordance with at least one embodiment of the present disclosure. Visible are the right-hand frame rail 110, left hand frame rail 120, No. 1 frame cross member 130, and No. 2 frame cross member 140. The vehicle frame also includes a bumper beam 210, and supports a cabin or vehicle occupant area 240. Protecting the vehicle occupant area 240 from excessive deceleration or intrusion during an SOL collision event is a feature of the present disclosure. Also visible are the front wheels 115 and breakaway tie rods 160, each of which includes a wheel knuckle attachment 162 and a steering rack attachment 164. In the example of FIG. 1, the breakaway tie rods are located in front of the lower control arms 170. However, depending on the vehicle type, tie rods 160 may be located behind the lower control arms 170.

In SOL collisions and other collisions, a tie rod 160 can be struck or loaded, either directly or indirectly, by the SOL barrier 220. This rearward force (i.e., a force acting toward the passenger cabin or vehicle occupant area 240) can cause the tie rod to push on the wheel 115, causing the wheel 115 to turn outward from the vehicle 200. In some instances, crash geometry may cause the tie rod to pull the wheel 115 inward toward the vehicle 200. In either case, the tie rod 160 drives unwanted or uncontrolled wheel motion which can affect crash dynamics and limit the ability of the wheel 115 to serve as a load path to transfer energy to the vehicle frame, and/or to push the vehicle 200 away from the barrier 220.

Uncontrolled motion of the front wheel can lead to uncontrolled intrusion of the wheel and/or the SOL barrier into the passenger cabin 240. In this case, deformation to the cabin 240 may be particularly severe. To avoid large deformations to the cabin 240, it may be advantageous to control loading between a front wheel or front tire 115 of the vehicle 200 and the rigid barrier 220, by including features in the tie rods 160 that cause them to fracture at a particular time, stroke (deformation distance), or force level during the crash event, thus preventing the tie rod 160 from driving unwanted or uncontrolled motion of the wheel 115. Due to the complex nature of part fracture and dynamics of the wheel, accurately controlling motion of the wheel can be difficult. In general, wheel motion is not repeatable, and small changes in wheel motion can drastically change crash test results. However, preventing unwanted wheel motion may also increase stability during crash, and thus improve the consistency or predictability of crash results. In an example, the breakaway tie rods 160 are made of steel, although other materials may be used instead or in addition.

A longitudinal axis 194a, 194b of each tie rod 160 is oriented substantially perpendicular to a longitudinal axis 192 of the vehicle (e.g., within 0 to 30 degrees of perpendicular). Although the SOL barrier 220 is shown here with a particular size and shape, it should be understood that an SOL barrier may be or include any fixed barrier such as a wall, sign post, telephone pole, light pole, concrete divider, guard rail, bridge abutment, tree, etc., or may in some cases be or include a large movable object such as a vehicle, wild animal, boulder, etc. It should also be understood that other types of barriers and collisions (e.g., head-on collisions) may in some cases cause similar damage patterns to those described above.

Before continuing, it should be noted that the examples described above are provided for purposes of illustration, and are not intended to be limiting. Other devices and/or device configurations may be utilized to carry out the operations described herein.

Figure 2:
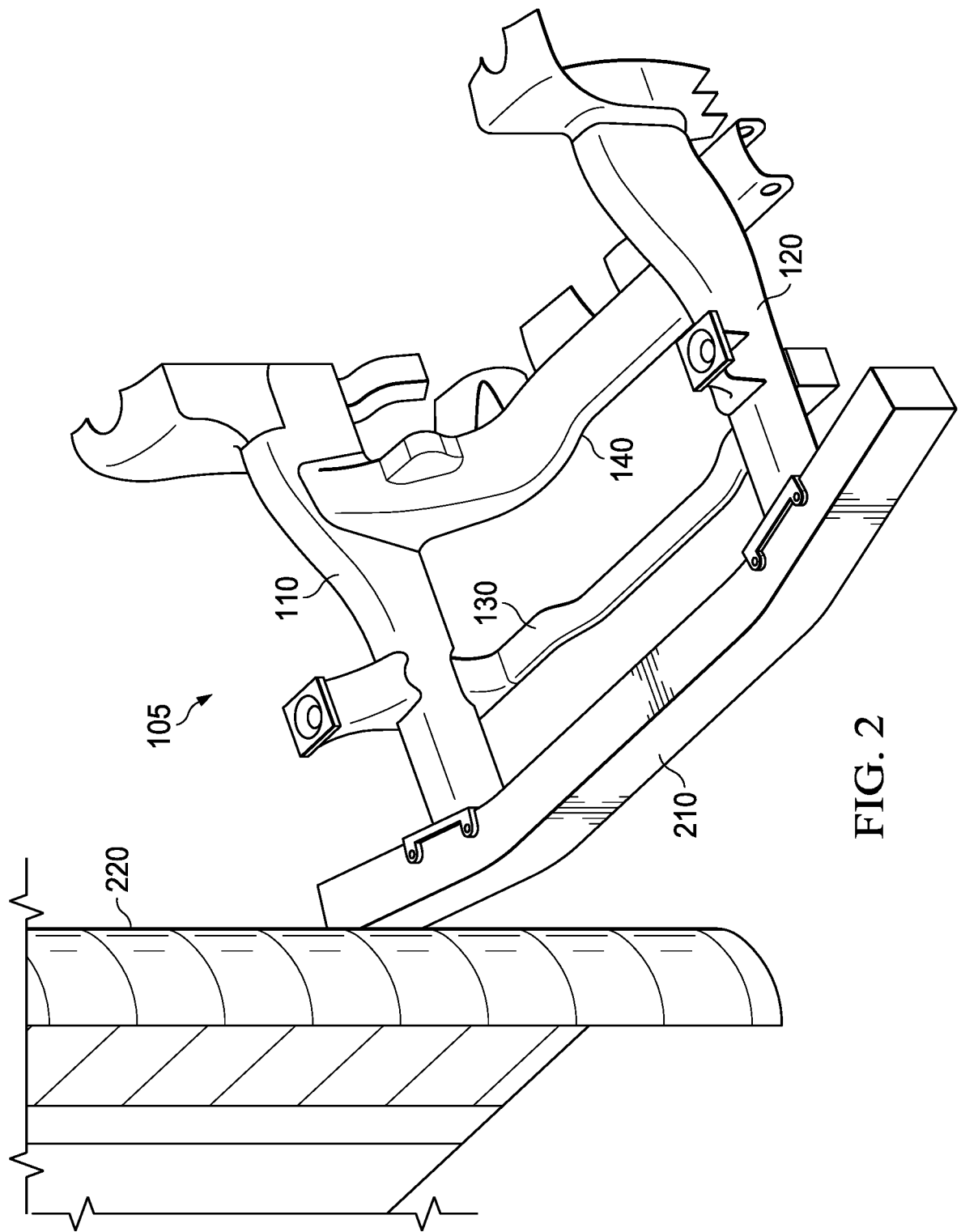
FIG. 2 is a perspective view of an example bumper beam being contacted by an SOL barrier in accordance with at least one embodiment of the present disclosure.

FIG. 2 is a perspective view of an example bumper beam 210 being contacted by an SOL barrier 220, in accordance with at least one embodiment of the present disclosure. The frame 105 includes the bumper beam 210, right frame rail 110, left frame rail 120, No. 1 frame cross member 130, and No. 2 frame cross member 140.

Figure 3:
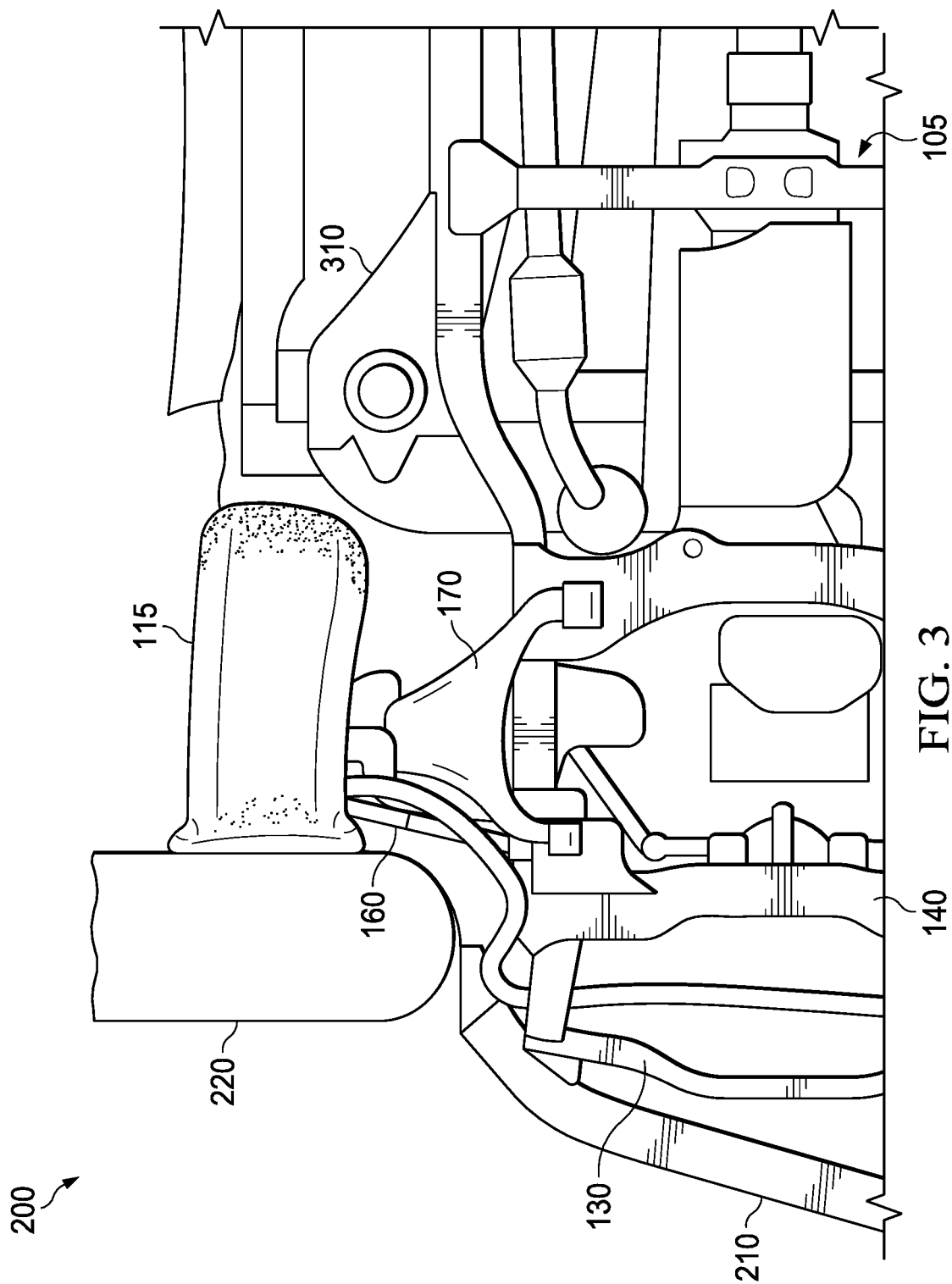
FIG. 3 is a bottom view of an example front wheel being contacted by an SOL barrier and deformed, in accordance with at least one embodiment of the present disclosure.

FIG. 3 is a bottom view of an example front wheel 115, being contacted by an SOL barrier 220 and deformed, in accordance with at least one embodiment of the present disclosure. The frame 105 of the vehicle 200 includes the bumper beam 210, right frame rail 110, No. 1 frame cross member 130, and No. 2 frame cross member 140. The wheel 115 is attached to the frame 105 by a suspension member or suspension element 170, such as a lower control arm. In the example shown in FIG. 3, the barrier 220 has bent or sheared the end of the bumper beam 210, such that the barrier 220 can directly contact the front wheel 115. In this example, the barrier 220 has not yet contacted the tie rod 160.

Figure 4:
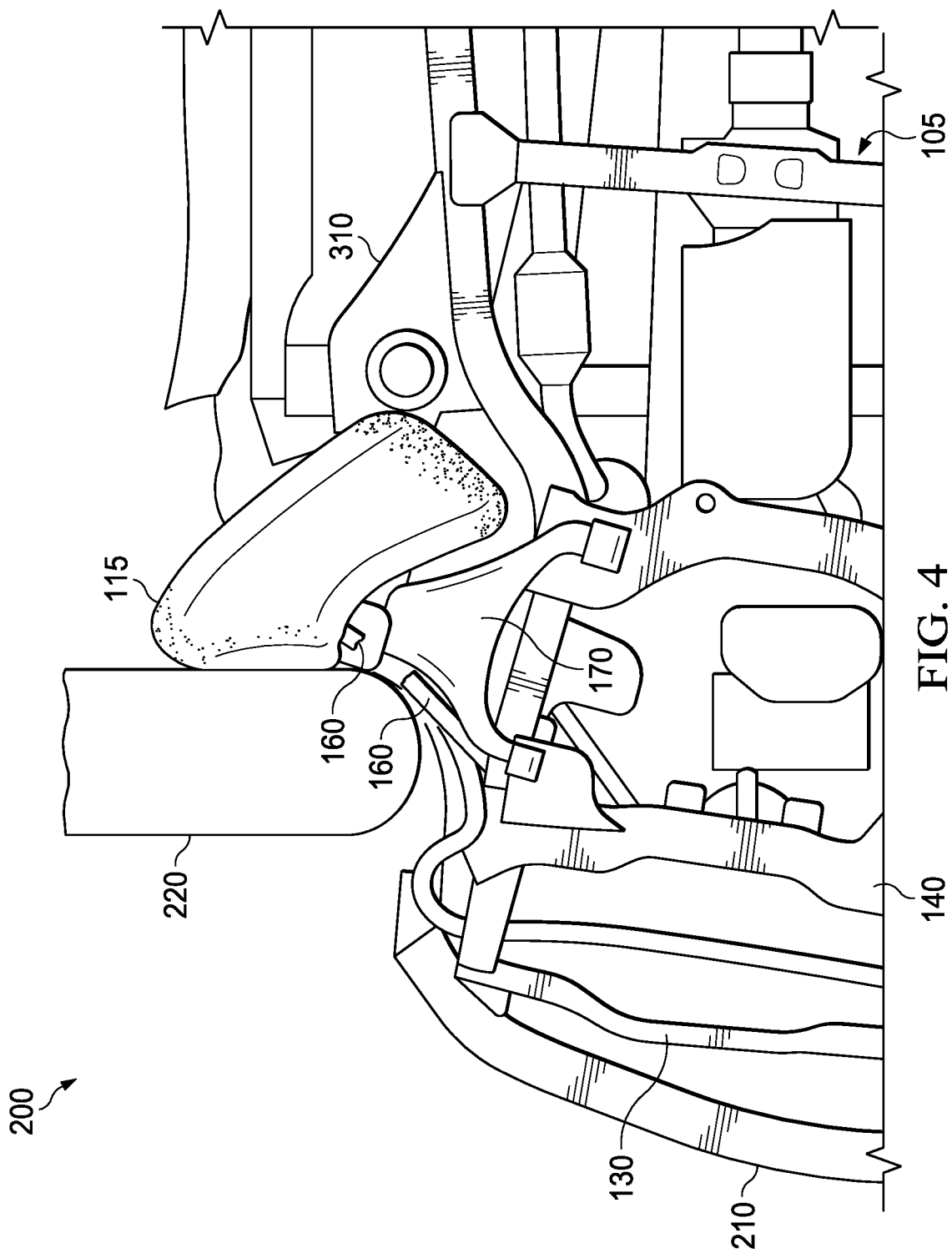
FIG. 4 is a bottom view of an example front wheel being contacted by an SOL barrier and displaced relative to the rest of the vehicle, in accordance with at least one embodiment of the present disclosure.

FIG. 4 is a bottom view of an example front wheel 115, being contacted by an SOL barrier 220 and displaced relative to the rest of the vehicle 200, in accordance with at least one embodiment of the present disclosure. The frame 105 of the vehicle 200 includes the bumper beam 210, right frame rail 110, No. 1 frame cross member 130, and No. 2 frame cross member 140, and a suspension member or suspension element 170 connecting the wheel to the frame. In many cases, the wheel can only displace through a certain angle or distance before fracturing away from the suspension member 170.

The nature of component fracture during a crash event is somewhat unstable or unpredictable unless control points are designed into the component. The present disclosure includes features that control the timing of fracture of the tie rod 160, which may help allow for the desired wheel motion during a crash. In the example of FIG. 4, the barrier 220 has contacted the breakaway tie rod 160, causing the breakaway tie rod 160 to fracture in a controlled manner. As a result, the wheel 115 has rotated outward in a controlled manner, to be caught by a wheel catcher 310, which transfers crash energy to the frame 105 along a load path that directs energy from the barrier 220 through the wheel 115 and wheel catcher 310. Controlled motion of the wheel 115 into the wheel catcher 310 may also help prevent the wheel 115 from intruding into the passenger cabin.

Figure 5:
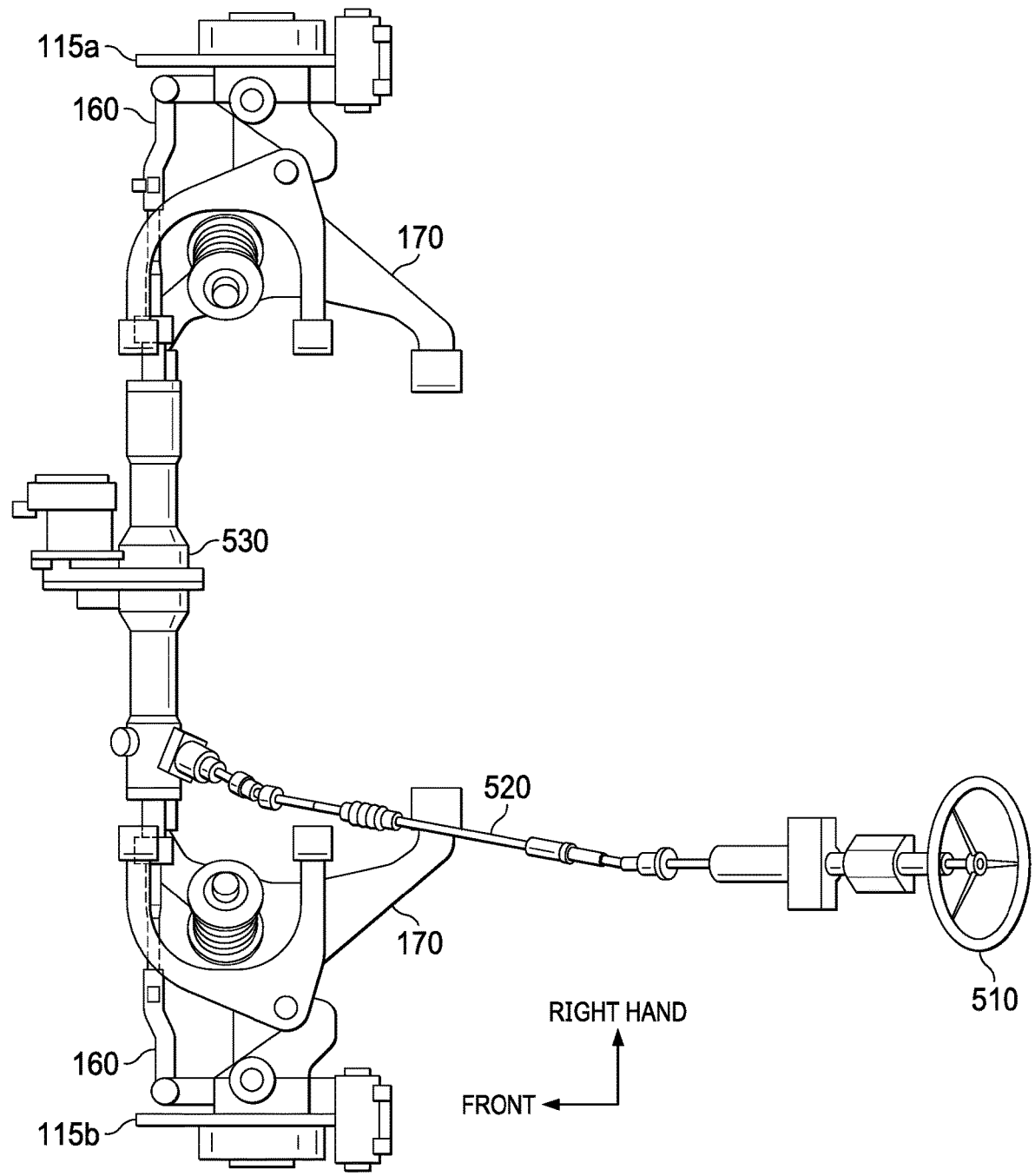
FIG. 5 is a bottom view of steering components of an example vehicle, in accordance with at least one embodiment of the present disclosure.

FIG. 5 is a bottom view of steering components of an example vehicle, in accordance with at least one embodiment of the present disclosure. Visible is a steering wheel 510. Clockwise or counterclockwise rotation of the steering wheel 510 drives corresponding rotation of the steering shaft 520, which drives left-right motion in the steering rack 530, which pushes or pulls on the tie rods 160. Thus, counterclockwise rotation of the steering wheel 510 causes the tie rods 160 to push the left wheel 115a outward from the vehicle and pull the right wheel 115b inward toward the vehicle, thus facilitating a left turn for the vehicle. Clockwise rotation similarly causes a right turn of the vehicle.

Figure 6:
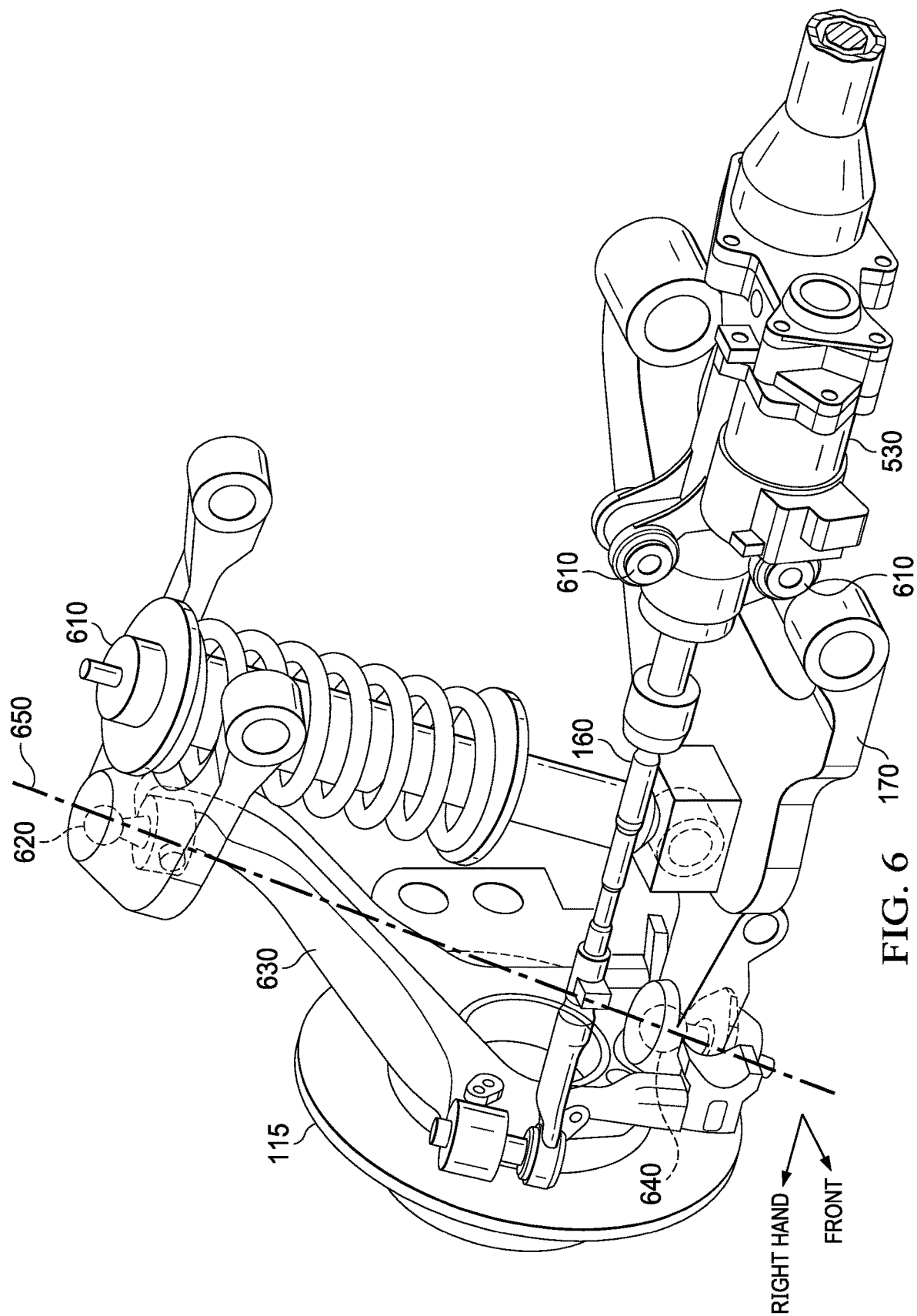
FIG. 6 is a front perspective view of steering and suspension components of an example vehicle, in accordance with at least one embodiment of the present disclosure.

FIG. 6 is a front perspective view of steering and suspension components of an example vehicle, in accordance with at least one embodiment of the present disclosure. Visible are the steering rack 530 and right tie rod 160. The tie rod 160 is pushed or pulled by the steering rack 530, which connects to the vehicle frame at frame connection points 610. The tie rod 160 connects to the steering knuckle 630, which drives the left-right rotation of the wheel 115 around a wheel rotation axis 650. To facilitate up-down motion of the wheel, the steering knuckle 630 attaches to the lower control arm 170 via a lower ball joint 640 and to the upper control arm 605 via an upper ball joint 620.

Figure 7:
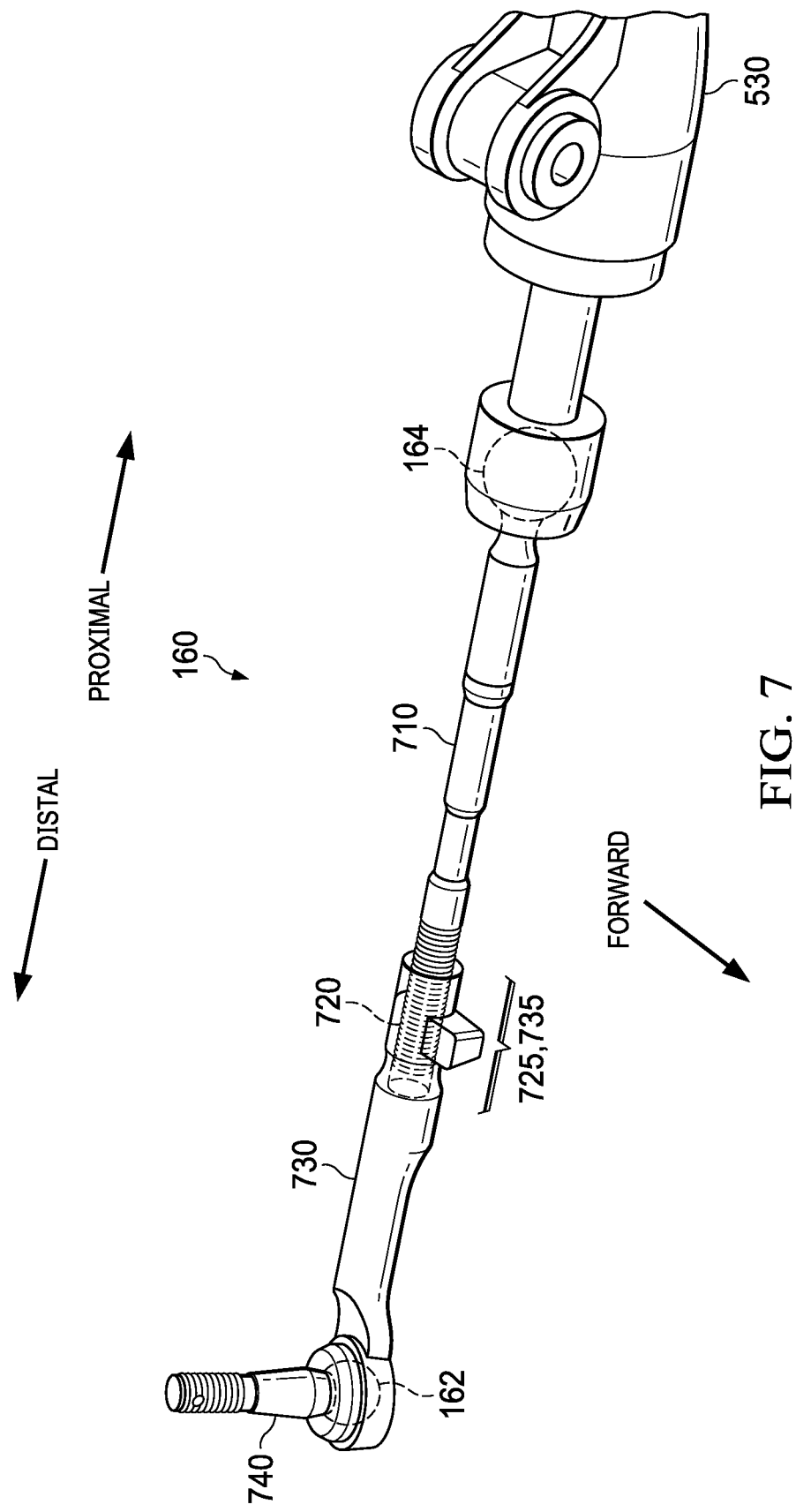
FIG. 7 is a front perspective view of steering and suspension components of an example vehicle, in accordance with at least one embodiment of the present disclosure.

FIG. 7 is a front perspective view of steering and suspension components of an example vehicle, in accordance with at least one embodiment of the present disclosure. Visible are the steering rack 530 and breakaway tie rod 160. The tie rod 160 includes a rod portion 710 and a receiver portion 730. The tie rod connects to the steering rack 530 via a proximal ball joint connection or steering rack attachment 164 at a proximal end of the rod portion 710, and connects to the steering knuckle (not pictured) via a bushing 740 that forms a distal ball joint connection or wheel knuckle attachment 162 with the tie rod 160 at a distal end of the receiver portion 730. A connection 720 is formed between a male coupling section 725 and female coupling section 735. For example, a male threaded section 725 disposed on a distal end of the rod portion 710 may screw into a female threaded section 735 disposed in a proximal end of the receiver portion 730, forming a threaded connection 720. Rotation of the rod portion 710 can therefore change the overall length of the tie rod 160, either shortening or lengthening it. This may be done for example during a front-end alignment procedure.

Figure 8A:
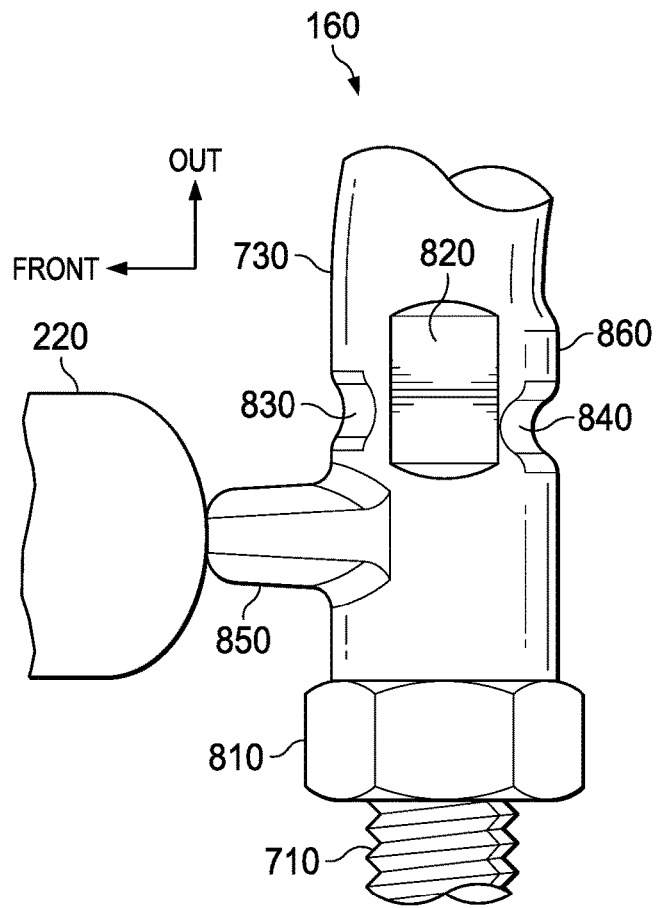
FIG. 8A is a top view of the connection between the rod portion and receiver portion of an example breakaway tie rod, in accordance with at least one embodiment of the present disclosure.

FIG. 8A is a top view of the connection between the rod portion 710 and receiver portion 730 of an example breakaway tie rod 160, in accordance with at least one embodiment of the present disclosure. A retaining nut 810 helps secure the threaded connection between portions 710 and 730. Several tuning features have been added to the receiver portion 730 to achieve the desired fracture force and timing, as described below.

Visible in this view are a forward notch 830 and a rear notch 840 in the body of the receiver portion 730. The rear notch 840 has been added to tune the initial fracture timing when a bending force, such as seen in the SOL crash mode, is imparted into the tie rod 160. The longitudinal position, depth, notch shape, and surface arch around the rear of the tie rod can all be tuned to achieve a stable fracture timing and loading. For example, the notch may be U-shaped, V-shaped, W-shaped, or any other cross section that achieves the desired fracture effect while preserving the strength of the receiver portion 730 in other crash modes, and in normal use.

A back-cut notch 830, located on the front of the tie rod, is used to control the crack propagation though the tie rod 160 during the SOL collision event. This notch can be tuned by changing the depth, notch shape, arch around the front of the part, and longitudinal position of the notch 830. When the breakaway tie rod 160 is loaded or contacted (whether directly or indirectly) by a barrier 220 during a collision event (e.g., an SOL collision), these notches 830 and 840 create a thinner profile and a reduced solid cross-sectional area for the receiver portion 730, thus encouraging the receiver portion 730 to fracture at these locations when loaded in a direction toward the rear of the vehicle. In the example shown in FIG. 8A, the front notch 830 and rear notch 840 occupy different longitudinal positions along the receiver portion 730, with the front notch 830 located further inward (e.g., more proximal, or closer to the vehicle centerline) and the rear notch 840 located further outward (e.g., more distal, or further from the vehicle centerline). However, in some embodiments, the two notches 830 and 840 may occupy the same longitudinal position along the receiver portion 730, or the rear notch 840 may be farther outward (e.g., more distal) than the front notch 830. In some embodiments, in place of the two notches 830 and 840, a neck or other narrowing feature may be provided.

Also visible is an extension or protuberance 850 projecting out from the receiver portion 730 in a substantially forward direction (e.g., projecting in a direction within 0-30 degrees of parallel to a longitudinal axis of the vehicle). To improve early contact timing to barrier the extension 850 may be added to the front (contact) side of the receiver portion 730. The extension can be varied in height (e.g., forward distance away from the receiver portion 730) and longitudinal location (e.g., location along the length of the receiver portion 730) to contact the barrier at desired locations. The extension 850 allows the barrier 220 to begin loading the breakaway tie rod 160 earlier in the crash event than would occur if the extension 850 were not present. The extension 850 may also help to concentrate impact stresses in a manner that is favorable to fracture of the receiver portion 730 at the notches 830 and 840. However, in embodiments that do not do not include the extension, the notches 830 and 840 will still facilitate fracture in these positions. It is noted that the notches 830 and 840 do not prevent the breakaway tie rod 160 from meeting all performance requirements for longitudinal stress, and thus do not substantially affect the likelihood of unwanted tie rod fracture during other crash modes, or during normal operation of the vehicle.

Existing tie rod receiver portions may be circular in cross-section. However, in some embodiments of the present disclosure the receiver portion may be elliptical or otherwise elongated in cross section due to a rear-facing bump 860, such that the receiver portion 730 has a greater cross-sectional solid area at the bump 860, as well as a lesser solid cross-sectional area at the notches 830 and 840. When present, this feature may also help to encourage fracture at the notches 830 and 840 during an SOL collision event.

Also visible is an optional wrench flat 820, which can help a worker hold the receiver portion 730 in place while the rod portion 710 is rotated. Although only one wrench flat 820 is visible in FIG. 8A, it should be understood that the receiver portion may include any number of wrench flats, including for example two wrench flats (e.g., located on opposite sides of a circumference of the receiver portion 730), four wrench flats (e.g., forming a square), six wrench flats (e.g., forming a hexagon), or other numbers of wrench flats depending on the implementation.

Figure 8B:
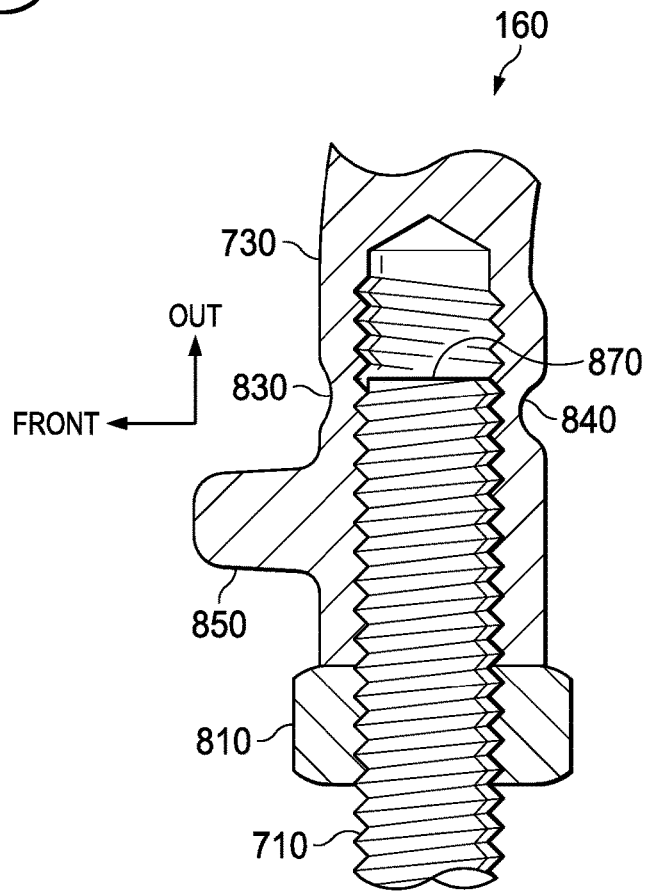
FIG. 8B is a cross-sectional view of the components shown in FIG. 8A, in accordance with at least one embodiment of the present disclosure.

FIG. 8B is a cross-sectional view of the components shown in FIG. 8A, in accordance with at least one embodiment of the present disclosure. Visible are the rod portion 710 and receiver portion 730 of the breakaway tie rod 160, along with the retaining nut 810, front notch 830, rear notch 840, and extension 850. As can be seen in FIG. 8B, the rod portion 710 can be threaded into the receiver portion 730, such that the distal end or outer end 870 of the rod portion 710 occurs at a longitudinal position proximate to the notches 830 and 840, to facilitate fracture of the receiving portion 730 at these locations.

Figure 9A:
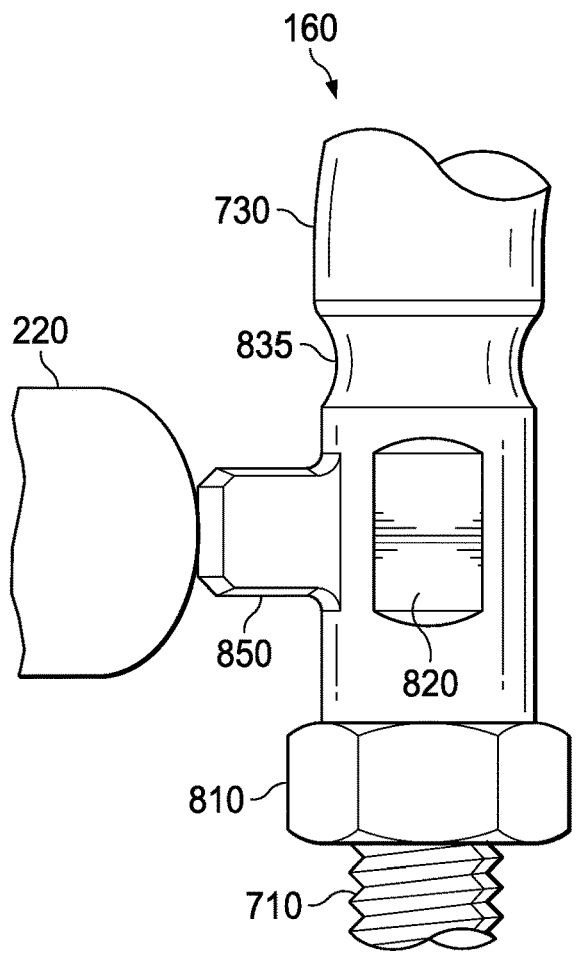
FIG. 9A is a is a top view of the connection between the rod portion and receiver portion of an example breakaway tie rod, in accordance with at least one embodiment of the present disclosure.

FIG. 9A is a is a top view of the connection between the rod portion 710 and receiver portion 730 of an example breakaway tie rod 160, in accordance with at least one embodiment of the present disclosure. Visible are the SOL barrier 220 and portions of the tie rod 160, including portions of the rod portion 710 and receiver portion 730. Also visible are the retaining nut 810, wrench flat 820, and extension 850. In the embodiment shown in FIG. 9A, the front notch and back notch have been replaced with a single neck 835, where both the diameter and the cross-sectional solid area of the receiver portion 730 have been reduced around an entire circumference of the receiver portion 730. The longitudinal position, depth, shape, and surface arch around the neck 835 can all be tuned to achieve a stable fracture timing and loading. For example, the neck 835 may have a U-shaped, V-shaped, or W-shaped cross section, or any other cross section that achieves the desired fracture effect while preserving the longitudinal strength of the receiver portion 730 in other crash modes, and in normal use.

Figure 9B:
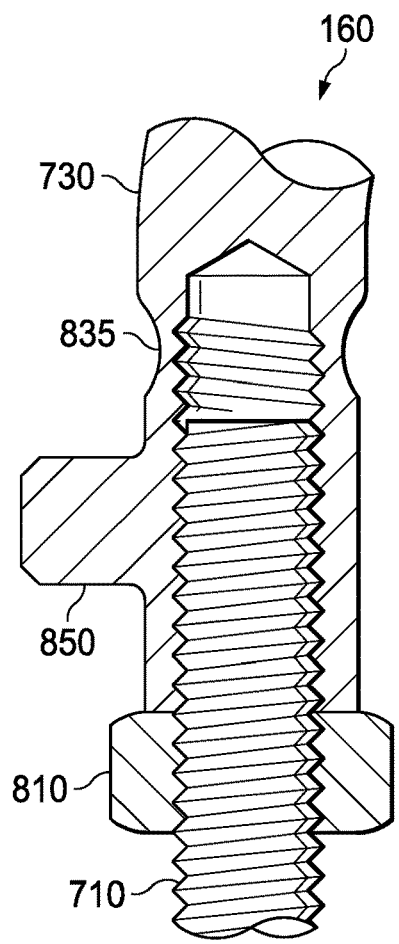
FIG. 9B is a is a cross-sectional view of the components shown in FIG. 9A, in accordance with at least one embodiment of the present disclosure.

FIG. 9B is a is a cross-sectional view of the components shown in FIG. 9A, in accordance with at least one embodiment of the present disclosure. Visible are the rod portion 710 and receiver portion 730 of the breakaway tie rod 160, along with the retaining nut 810, neck 835, and extension 850. As can be seen in FIG. 8B, the rod portion 710 can be threaded into the receiver portion 730, such that the distal end or outer end 870 of the rod portion 710 occurs at a longitudinal position proximate to the neck 835, to facilitate fracture of the receiving portion 730 at this location.

FIG. 10A is a top view of an example baseline tie rod 159, which lacks some novel features of the present disclosure, being contacted by a barrier 220, in accordance with aspects of the present disclosure. In this example, the barrier 220 has been in contact with the receiver portion 730 of the baseline tie rod 159, loading it in a rearward direction for a period of 53 milliseconds. This has resulted in bending of the rod portion 710 and receiver portion 730 of the baseline tie rod 159, as well as the creation of stress concentrations 998.

FIG. 10B is a top view of an example breakaway tie rod 160 being contacted by a barrier 220, in accordance with at least one embodiment of the present disclosure. In this example, the barrier 220 has been in contact with the extension 850 of the receiver portion 730 of the breakaway tie rod 160, loading it in a rearward direction for a period of 53 milliseconds. This has resulted in bending of the rod portion 710 and receiver portion 730 of the breakaway tie rod 160, as well as the creation of stress concentrations 1000. The stress concentrations 1000 of FIG. 10B are more pronounced than the stress concentrations 998 of FIG. 10A, and are also localized within the neck 835, thereby encouraging the receiver portion 730 to fracture at this point if loading continues.

Figure 11A:
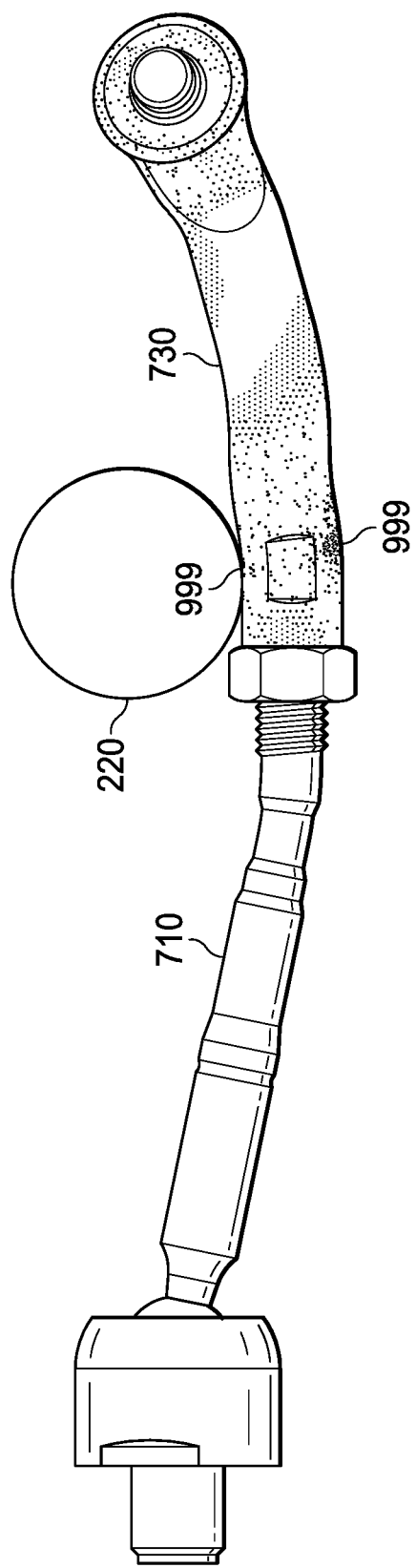
FIG. 11A is a is a top view of an example baseline tie rod, which lacks some novel features of the present disclosure, being contacted by a barrier, in accordance with aspects of the present disclosure.

FIG. 11A is a is a top view of an example baseline tie rod 159, which lacks some novel features of the present disclosure, being contacted by a barrier 220, in accordance with aspects of the present disclosure. In this example, the barrier 220 has been in contact with the receiver portion 730 of the baseline tie rod 159, loading it in a rearward direction for a period of 72 milliseconds. This has resulted in further bending of the rod portion 710 and receiver portion 730 of the baseline tie rod 159, as well as the creation of stress concentrations 999, which are more pronounced than, and distributed across a larger area than, the stress concentrations 998 of FIG. 10A.

Figure 11B:
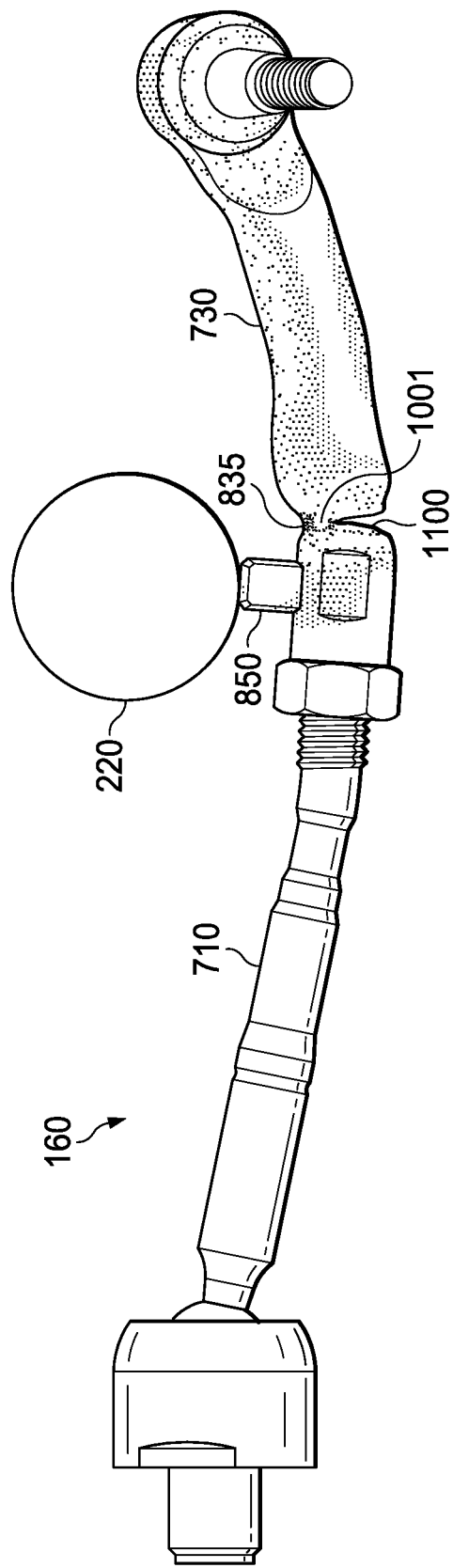
FIG. 11B is a is a top view of an example breakaway tie rod being contacted by a barrier, in accordance with at least one embodiment of the present disclosure.

FIG. 11B is a is a top view of an example breakaway tie rod 160 being contacted by a barrier 220, in accordance with at least one embodiment of the present disclosure. In this example, the barrier 220 has been in contact with the extension 850 of the receiver portion 730 of the breakaway tie rod 160, loading it in a rearward direction for a period of 72 milliseconds. This has resulted in the creation of stress concentrations 1001 in the receiver portion 730. The stress concentrations 1000 of FIG. 10B are more pronounced than the stress concentrations 999 of FIG. 11A, and are also localized within the neck 835, thereby creating a fracture 1100 of the receiver portion 730. Additional time, stroke, or loading within the crash event are likely to cause a complete fracture and separation of the receiver portion 730, thus preventing the breakaway tie rod 160 from pushing or pulling on the wheel. Such fracture and separation thus reduce unwanted or uncontrolled wheel motion during the crash event, which may tend to reduce cabin intrusion and/or cabin deformation.

Figure 12:
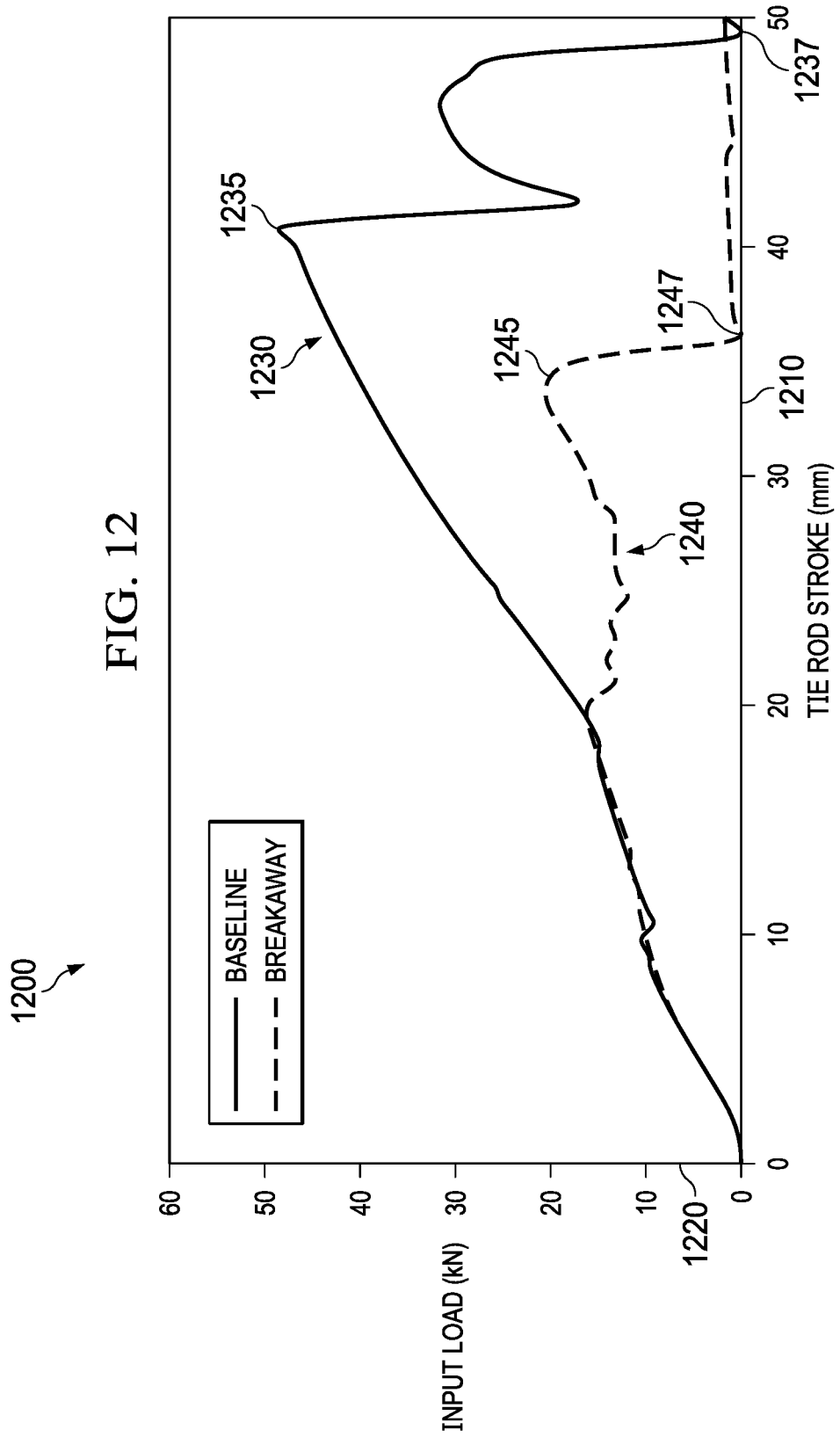
FIG. 12 is a graph showing the fracture properties of two different tie rod designs, in accordance with at least one embodiment of the present disclosure.

FIG. 12 is a graph 1200 showing the fracture properties of two different tie rod designs, in accordance with at least one embodiment of the present disclosure. The graph 1200 shows tie rod stroke 1210 (e.g., the rearward movement of the barrier against a particular portion of the tie rod, in millimeters (mm)) on an X-axis, and input load (e.g., the force exerted by the barrier on a particular portion of the tie rod, in kilonewtons (kN)) on a Y-axis. A "baseline" curve 1230 shows the response of a baseline tie rod lacking some novel features of the present disclosure. In this example, the baseline curve 1230 exhibits an initial fracture 1235 at a force loading of approximately 50 kN and a stroke of approximately 40 mm, and a complete separation of the tie rod (e.g., input load reduction to zero) at a stroke of approximately 50 mm. A "breakaway" curve 1240 shows the response of a breakaway tie rod in accordance with at least one embodiment of the present disclosure. The "breakaway" curve exhibits an initial fracture 1245 at an input load of approximately 20 kN and a stroke of approximately 34 mm, and exhibits a total separation (e.g., input load reduction to zero) at a stroke of approximately 35 mm.

The novel features of the present disclosure have allowed for the tuning of tie rod separation timing during the crash event. Tie rod separation has been reduced from 50 mm to 35 mm of barrier stroke, thus increasing the chance that tie rod separation will occur earlier in the crash event. By controlling this separation timing, the breakaway tie rod has stabilized the motion of the wheel, thus improving the action of the wheel as a load path for distributing crash energy to the vehicle frame, and therefore reducing the opportunities for cabin deformation.

Accordingly, it can be seen that the breakaway tie rod offers substantial improvement, by improving passenger safety in the challenging frontal crash mode called small overlap rigid barrier (SOL), wherein a vehicle strikes a rigid barrier at ~25% overlap or less to the vehicle width. The breakaway tie rod permits advantageous positioning of the wheel during a crash event, thus improving load distribution and energy dissipation, and reducing deformation of the vehicle cabin.

Depending on the implementation, the breakaway tie rod may be made from a variety of different materials, including but not limited to metals, composites, ceramics, and polymers. Breakaway tie rod members may be hollow or solid so as to provide a high degree of control over wheel positioning during an SOL collision event, with low added weight. Some components may be annealed or case-hardened to tune their fracture properties. Attachment may be with bolts, screws, rivets, rods, pins, clips, brackets, adhesives, welds, or otherwise, and may be to various portions of the wheel knuckle and steering rack. Furthermore, a number of variations are possible on the examples and embodiments described above. For example, the components could be longer, shorter, wider, thicker or of different shape than depicted herein, and may be oriented or angled in alternative manners that serve the same purpose of limiting unwanted or uncontrolled wheel motion during a crash event. The technology described herein may be employed in automobiles and trucks of diverse type and design, regardless of their underlying propulsion technologies.

Accordingly, the logical operations making up the embodiments of the technology described herein are referred to variously as operations, steps, objects, elements, components, or modules. It should be understood that these may occur or be arranged in any order, unless explicitly claimed otherwise or a specific order is inherently necessitated by the claim language.

In some implementations, the components are threaded together. In other embodiments, multiple parts are welded together or co-formed as single parts. It should further be understood that the described technology may be employed in diverse vehicle types, whether motorized or not, including but not limited to vans, minivans, SUVs, crossover vehicles, RVs, trailers, mobile homes, food trucks, and first responder vehicles.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the breakaway tie rod. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the breakaway tie rod as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A component for a vehicle, comprising:
a longitudinal axis disposed substantially orthogonal to a longitudinal axis of the vehicle;
a rod portion aligned with the longitudinal axis of the component, wherein the rod portion comprises:
a proximal end;
a proximal ball joint disposed at the proximal end;
a distal end;
a male coupling section disposed at the distal end; and
a receiver portion aligned with the longitudinal axis of the component, wherein the receiver portion comprises:
a proximal end;
a female coupling section disposed at the proximal end;
a distal end;
a distal ball joint disposed at the distal end;
a wrench flat;

a narrowing feature different from the wrench flat and disposed between the proximal end and distal end of the receiver portion, wherein the narrowing feature of the receiver portion is configured to fracture when subjected to a threshold force substantially parallel to the longitudinal axis of the vehicle; and a protuberance disposed on the receiver portion adjacent to the narrowing feature and projecting in a substantially forward direction along the longitudinal axis of the vehicle, such that during a crash event involving a barrier, the protuberance allows the barrier to contact the component earlier in the crash event than would occur if the protuberance were not present, wherein the male coupling section of the rod portion is received into the female coupling section of the receiver portion, forming a connection, wherein the distal end of the rod portion is disposed proximate to the narrowing feature.

2. The component of claim 1, wherein the narrowing feature of the receiver portion comprises a neck.

3. The component of claim 1, wherein the narrowing feature of the receiver portion comprises at least one notch.

4. The component of claim 1, wherein the distal ball joint connects to a steering knuckle of the vehicle.

5. The component of claim 1, wherein the proximal ball joint connects to a steering rack of the vehicle.

6. The component of claim 1, wherein the vehicle is configured such that fracturing the narrowing feature of the receiver portion prevents the component from affecting motion of a wheel of the vehicle.

7. The component of claim 1, wherein the male coupling section comprises a male threaded section, wherein the female coupling section comprises a female threaded section.

8. A method comprising:
along a longitudinal axis disposed substantially orthogonal to a longitudinal axis of a vehicle, providing a component comprising:
  a rod portion comprising:
    a proximal end;
    a proximal ball joint disposed at the proximal end;
    a distal end;
    a male threaded section disposed at the distal end;
  a receiver portion comprising:
    a proximal end;
    a female threaded section disposed at the proximal end;
    a distal end;
    a distal ball joint disposed at the distal end; and
    a wrench flat;
narrowing a section of the receiver portion different from the wrench flat and disposed between the proximal end and distal end, wherein the narrowed section of the receiver portion is configured to fracture when subjected to a threshold shearing force substantially parallel to the longitudinal axis of the vehicle;
providing a protuberance disposed on the receiver portion adjacent to the narrowing feature and projecting in a substantially forward direction along the longitudinal axis of the vehicle, such that during a crash event involving a barrier, the protuberance allows the barrier to contact the component earlier in the crash event than would occur if the protuberance were not present; and
receiving the male threaded section of the rod portion into the female threaded section of the receiver portion, forming a threaded connection,
such that the distal end of the rod portion is disposed proximate to the narrowed section.

9. The method of claim 8, wherein the narrowed section of the receiver portion comprises a neck.

10. The method of claim 8, wherein the narrowed section of the receiver portion comprises at least one notch.

11. The method of claim 8, further comprising connecting the distal ball joint to a steering knuckle of the vehicle.

12. The method of claim 8, further comprising connecting the proximal ball joint to a steering rack of the vehicle.

13. The method of claim 8, wherein fracturing the narrowed section of the receiver portion prevents the component from affecting motion of a wheel of the vehicle.

14. A system for distributing crash energy within a vehicle, comprising:
the vehicle;
a front wheel of the vehicle;
a steering knuckle coupled the front wheel;
a frame of the vehicle;
a steering rack coupled to the frame;
a tie rod,
wherein the tie rod is connected to the steering knuckle by a distal ball joint,
wherein the tie rod is connected to the steering rack by a proximal ball joint,
wherein the tie rod comprises:
  a longitudinal axis;
  a rod portion aligned with the longitudinal axis, wherein the rod portion comprises:
    a proximal end;
    the proximal ball joint disposed at the proximal end;
    a distal end;
    a male coupling section disposed at the distal end;
  a receiver portion aligned with the longitudinal axis, wherein the receiver portion comprises:
    a proximal end;
    a female coupling section disposed at the proximal end;
    a distal end;
    the distal ball joint disposed at the distal end;
    a wrench flat;
    a narrowing feature different from the wrench flat and disposed between the proximal end and distal end of the receiver portion, wherein the narrowing feature is configured to fracture when subjected to a threshold shearing force substantially parallel to the longitudinal axis of the vehicle; and
    a protuberance disposed on the receiver portion adjacent to the narrowing feature and projecting in a substantially forward direction along the longitudinal axis of the vehicle, such that during a crash event involving a barrier, the protuberance allows the barrier to contact the component earlier in the crash event than would occur if the protuberance were not present.

* * * * *